United States Patent [19]

Seper et al.

[11] Patent Number: 5,441,669
[45] Date of Patent: Aug. 15, 1995

[54] PREVENTING POTASSIUM BICARBONATE FROM CAKING

[76] Inventors: Karl W. Seper, 412 Riverview Dr.; Robert L. Zeller, III, 425 Hawthorne Pl., both of Youngstown, N.Y. 14174; Russell J. Morgan, 2276 Center Ct. N., Grand Island, N.Y. 14072

[21] Appl. No.: 270,604

[22] Filed: Jul. 5, 1994

[51] Int. Cl.⁶ .......................... C11D 3/48; C01D 7/10
[52] U.S. Cl. ........................ 252/385; 423/267; 423/422
[58] Field of Search ............ 423/267, 425, 422; 106/35, 36; 252/7, 106, 184, 194, 385; 424/717

[56] References Cited

U.S. PATENT DOCUMENTS

| | | | |
|---|---|---|---|
| 3,141,730 | 7/1964 | Le Baron | 252/7 |
| 4,260,651 | 4/1981 | Wixon | 252/385 |
| 4,919,910 | 4/1990 | Kurtz et al. | 423/422 |
| 5,112,592 | 5/1992 | Kurtz | 423/425 |

FOREIGN PATENT DOCUMENTS 61-310018 12/1986 Japan .

*Primary Examiner*—Ferris Lander
*Assistant Examiner*—Stuart L. Hendrickson
*Attorney, Agent, or Firm*—Wayne A. Jones; Richard D. Fuerle

[57] ABSTRACT

Disclosed is a method of preventing potassium bicarbonate from caking. Anhydrous potassium carbonate is dispersed throughout the potassium bicarbonate immediately after it is manufactured. Preferably, about 0.1 to about 2.5 wt % of the anhydrous potassium carbonate is used. Also disclosed is a composition made by that method.

9 Claims, No Drawings

PREVENTING POTASSIUM BICARBONATE FROM CAKING

BACKGROUND OF THE INVENTION

This invention relates to a method of preventing newly manufactured potassium bicarbonate from caking and to the cake-free potassium bicarbonate product. In particular, it relates to the addition of about 0.1 to about 2.5 wt % anhydrous potassium carbonate to newly manufactured potassium bicarbonate.

Potassium bicarbonate is useful in many industrial processes and consumer products. For example, it is used in dry-powder fire extinguishers where it is approximately twice as effective as sodium bicarbonate. However, potassium bicarbonate has a tendency to cake and in certain applications it must be free-flowing. Caking can be prevented by placing it in intimate contact with an anti-caking agent. There are numerous commercially available anti-caking agents such as, for example, silica gel, which can be used to produce free-flowing potassium bicarbonate. These anti-caking agents are usually selected on a cost-performance basis. However, if the potassium bicarbonate is to be used in certain applications, an anti-caking agent, even if it is safe, may be considered undesirable since its presence may exceed a specification limit or cause turbidity or problems in downstream reactions.

SUMMARY OF THE INVENTION

We have discovered that potassium bicarbonate can be prevented from caking if anhydrous potassium carbonate is dispersed throughout it. This is a surprising result because potassium carbonate is used to make potassium bicarbonate and some potassium carbonate remains in the potassium bicarbonate product. Moreover, at the temperature at which the potassium bicarbonate is dried after it is made, one would expect any potassium carbonate that is present to be in the anhydrous form. Thus, since there is already anhydrous potassium carbonate in the potassium bicarbonate product, and yet the potassium bicarbonate product still cakes, one would not expect the addition of more anhydrous potassium carbonate to reduce the caking.

The major advantage of using small amounts of potassium carbonate to prevent the caking of potassium bicarbonate is that potassium carbonate can be a raw material used in the manufacture of potassium bicarbonate. Therefore, when the potassium bicarbonate is used in certain products, it may not be necessary to obtain additional approval for the presence of small amounts of potassium carbonate. Additionally, the presence of small amounts of potassium carbonate in potassium bicarbonate does not materially affect the solution pH of the mixture.

DESCRIPTION OF THE PREFERRED EMBODIMENT

Potassium bicarbonate can be made by reacting potassium carbonate with carbon dioxide and water according to the equation $$K_2CO_3 + CO_2 + H_2O \rightarrow 2KHCO_3$$

This process is typically performed by making a solution of potassium carbonate in water and sparging carbon dioxide through the solution. (There are, in fact, many possible variations in the manufacture of potassium bicarbonate. For example, one might use ion exchange or heat potassium bicarbonate. Other processes are also possible, but they all form potassium bicarbonate which cakes.) Since the potassium bicarbonate is not as soluble as the potassium carbonate, it precipitates out of the solution, and can be recovered by filtration or centrifugation.

The wet potassium bicarbonate is then heated to dry it. This can be accomplished in a dryer using air heated up to about 165° C., but typically at about 135° C. The potassium bicarbonate crystals are heated only for a few minutes, which is not long enough to decompose them back into potassium carbonate. Depending on the operation of the reactor, filtration, or drying system, the potassium bicarbonate product can contain about 0.1% to about 0.5% wt/wt potassium carbonate. While the potassium carbonate that exits the dryer with the potassium bicarbonate could be either potassium carbonate sesquihydrate or anhydrous potassium carbonate, we believe the form of potassium carbonate is anhydrous. It is known that potassium carbonate sesquihydrate dehydrates in the temperature range from as low as 70° C. to about 105° C. The dryer outlet temperature and crystal temperature is estimated to be about 85° C.

Normally, these crystals form very hard lumps within one or two days after they have been packaged in drums or bags. Historically, there has never been an observed correlation of % potassium carbonate contained in the potassium bicarbonate and the products' tendency to cake upon storage. However, this lumping or caking is prevented if the crystals are mixed with anhydrous potassium carbonate as soon as they are manufactured. It is preferred to use about 0.1 to about 2.5 wt % anhydrous potassium carbonate, based on potassium bicarbonate weight, as less potassium carbonate is ineffective and more is unnecessary. It is essential that the potassium carbonate be uniformly dispersed throughout the potassium bicarbonate in order to prevent caking as portions of the potassium bicarbonate that are not mixed with the potassium carbonate may cake.

If the potassium bicarbonate product is to be used in an application that requires the presence of little or no potassium carbonate, the potassium carbonate that is present can be converted into potassium bicarbonate by the addition of carbon dioxide and water.

The following examples further illustrate this invention.

EXAMPLE 1

A large sample of dried potassium bicarbonate (KBC) containing up to about 0.1 wt % potassium carbonate was collected from a commercial KBC plant. This sample was split into seven samples of approximately 400 grams. A predetermined amount of anhydrous potassium carbonate was then added to each KBC sample and the mixtures were placed in high density polyethylene sample bottles. The bottles were tightly sealed with tape and were shaken vigorously to disperse the anhydrous potassium carbonate throughout the KBC.

After 1 and 14 days, caking was measured in one of two ways. In the first technique, a sample bottle was slowly rotated and the angle at which the KBC started to flow was measured. The larger the angle before flow occurred, the higher the degree of caking. In the second technique, the KBC was placed on a U.S. No. 8 mesh screen, the screen was shaken for 5 seconds, and the weight percentage of KBC retained on the screen was measured. A higher weight percentage on the screen indicated a higher degree of caking. The results are given in the following table.

| Wt % K$_2$CO$_3$ Added | Angle to Fall After 1 day | Angle to Fall After 14 days | Wt % on US Mesh #8 After 1 day | Wt % on US Mesh #8 After 14 days |
| --- | --- | --- | --- | --- |
| 0.0 | 180 | 160 | 2.13 | 25.51 |
| 0.10 | 70 | 180 | 0.96 | 9.85 |
| 0.25 | 65 | 180 | 1.53 | 10.06 |
| 0.50 | 70 | 40 | 0.66 | 0.23 |
| 0.75 | 40 | 40 | 0.61 | 0.33 |
| 1.2 | 45 | 30 | 0.61 | 0.34 |
| 2.5 | 35 | 25 | 0.68 | 0.26 |

The table shows that as little as 0.1% K$_2$CO$_3$ dispersed into the KBC had a beneficial impact on caking and that 0.5 to 2.5 wt % K$_2$CO$_3$ essentially eliminated KBC caking for up to 14 days.

EXAMPLE 2

Potassium bicarbonate (KBC) was heated to 150° C. for 1 hour. The weight loss was 30.9%. The solids after heating were identified as anhydrous potassium carbonate. This example teaches that KBC can be converted to anhydrous potassium carbonate, which can then be added to KBC to eliminate caking.

We claim:

1. A method of making a composition which comprises potassium bicarbonate comprising (A) reacting potassium carbonate with carbon dioxide and liquid water to produce wet potassium bicarbonate;
   (B) heating said wet potassium bicarbonate to produce dry potassium bicarbonate; and
   (C) uniformly dispersing about 0.1 to about 25 wt % anhydrous potassium carbonate throughout said potassium bicarbonate.

2. A method according to claim 1 wherein said anhydrous potassium carbonate is made by heating potassium bicarbonate.

3. A method according to claim 1 wherein the amount of anhydrous potassium carbonate dispersed throughout said potassium bicarbonate is about 0.5 to about 2.5 wt %.

4. A method according to claim 1 wherein said anhydrous potassium carbonate is dispersed throughout said potassium bicarbonate immediately after said potassium bicarbonate has been dried.

5. A method according to claim 1 including the additional last step of adding carbon dioxide and water to said potassium bicarbonate to convert potassium carbonate into potassium bicarbonate.

6. A method according to claim 1 wherein said heating is at a temperature up to 165° C.

7. A method according to claim 1 wherein said heating is at a temperature up to 135° C.

8. A method according to claim 1 wherein said potassium bicarbonate is dried inn Step (B) by heating at a temperature up to 165° C.

9. A method according to claim 1 wherein said potassium bicarbonate is dried in Step (B) by heating at a temperature up to 135° C.

* * * * *